(12) United States Patent
Kirkpatrick

(10) Patent No.: US 10,521,242 B2
(45) Date of Patent: *Dec. 31, 2019

(54) APPLICATION CONTAINERS WITH UPDATABLE APPLICATION PROGRAMMING INTERFACE LAYERS

(71) Applicant: Google Inc., Mountain View, CA (US)

(72) Inventor: Ficus Kirkpatrick, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/406,502

(22) Filed: Jan. 13, 2017

(65) Prior Publication Data

US 2017/0206123 A1 Jul. 20, 2017

Related U.S. Application Data

(60) Provisional application No. 62/279,571, filed on Jan. 15, 2016.

(51) Int. Cl.
*G06F 9/54* (2006.01)
*G06F 9/445* (2018.01)
(Continued)

(52) U.S. Cl.
CPC ............ *G06F 9/44505* (2013.01); *G06F 8/61* (2013.01); *G06F 8/65* (2013.01); *G06F 9/445* (2013.01);
(Continued)

(58) Field of Classification Search
None
See application file for complete search history.

(56) References Cited

U.S. PATENT DOCUMENTS 6,292,933 B1 9/2001 Bahrs et al.
6,317,143 B1 11/2001 Wugofski
(Continued)

FOREIGN PATENT DOCUMENTS

JP 2002358208 A 12/2002
JP 2004529419 A 9/2004
(Continued)

OTHER PUBLICATIONS

Kinney; "Getting started with Microsoft Application Virtualization"; TechNet Magazine; Nov. 2008; from IDS filed on May 17, 2017 (Year: 2008).*

(Continued)

*Primary Examiner* — Umut Onat
(74) *Attorney, Agent, or Firm* — Shumaker & Sieffert, P.A.

(57) ABSTRACT

In some examples, a method includes, receiving, by a supervisor component, a request to execute particular functionality of an application and, responsive to receiving the request, identifying, by an application container for maintaining installable sub-packages of the application, a minimum version of a library specified in an application definition of the application. The method may also include, responsive to determining that the application container does not include the minimum version of the library: retrieving an instance of the library with a version that is greater than or equal to the minimum version; installing the instance of the library in the container runtime of the application container; and executing the application using the instance of the library in the container.

20 Claims, 3 Drawing Sheets

(51) Int. Cl.
*H04L 29/08* (2006.01)
*H04L 12/24* (2006.01)
*G06F 8/61* (2018.01)
*G06F 8/65* (2018.01)

(52) U.S. Cl.
CPC .......... *G06F 9/44521* (2013.01); *G06F 9/546* (2013.01); *H04L 41/02* (2013.01); *H04L 67/142* (2013.01); *H04L 67/146* (2013.01); *H04L 67/148* (2013.01); *H04L 67/34* (2013.01)

(56) References Cited

U.S. PATENT DOCUMENTS

| | | | |
|---|---|---|---|
| 6,754,896 | B2 | 6/2004 | Mishra et al. |
| 7,181,686 | B1 | 2/2007 | Bahrs |
| 7,206,844 | B2 | 4/2007 | Gupta et al. |
| 7,698,383 | B2 | 4/2010 | Goring et al. |
| 7,707,574 | B2 | 4/2010 | Goring et al. |
| 8,095,940 | B2 | 1/2012 | Bissett et al. |
| 8,112,749 | B2 | 2/2012 | Jelinek et al. |
| 8,495,625 | B1 | 7/2013 | Sanders |
| 8,782,744 | B1* | 7/2014 | Fuller .................... G06F 21/52 709/225 |
| 8,832,296 | B2 | 9/2014 | Yandek et al. |
| 8,943,150 | B2 | 1/2015 | Massey et al. |
| 9,612,815 | B1 | 4/2017 | Jagtap et al. |
| 9,675,890 | B2 | 6/2017 | Ahiska et al. |
| 9,705,973 | B2 | 7/2017 | Austel et al. |
| 9,772,835 | B1 | 9/2017 | Trautmann et al. |
| 9,773,102 | B2 | 9/2017 | Graham et al. |
| 9,817,648 | B2* | 11/2017 | Kirkpatrick ............... G06F 8/61 |
| 9,854,047 | B2 | 12/2017 | Elias et al. |
| 9,871,745 | B2 | 1/2018 | Steinder et al. |
| 9,898,397 | B2 | 2/2018 | Arif et al. |
| 10,268,531 | B2 | 4/2019 | Kirkpatrick et al. |
| 10,324,734 | B2 | 6/2019 | Kirkpatrick |
| 10,409,657 | B2 | 9/2019 | Kirkpatrick et al. |
| 2004/0103412 | A1 | 5/2004 | Rao et al. |
| 2005/0049790 | A1* | 3/2005 | Holman .................... G06F 8/61 702/3 |
| 2005/0193139 | A1 | 9/2005 | Vinson et al. |
| 2006/0075381 | A1 | 4/2006 | Laborczfalvi et al. |
| 2009/0133014 | A1 | 5/2009 | Laurila et al. |
| 2009/0265788 | A1 | 10/2009 | Ehrenschwender et al. |
| 2010/0313196 | A1 | 12/2010 | De Atley et al. |
| 2011/0119684 | A1 | 5/2011 | Suggs et al. |
| 2013/0019237 | A1 | 1/2013 | Pardehpoosh et al. |
| 2013/0204975 | A1 | 8/2013 | Keith, Jr. |
| 2013/0325967 | A1 | 12/2013 | Parks et al. |
| 2013/0346958 | A1* | 12/2013 | Cohen ..................... G06F 8/65 717/170 |
| 2014/0007074 | A1 | 1/2014 | Sporkert et al. |
| 2014/0033196 | A1* | 1/2014 | Biswas ..................... G06F 8/61 717/174 |
| 2014/0215451 | A1 | 7/2014 | Nachtigal |
| 2014/0229951 | A1 | 8/2014 | Zhang |
| 2014/0282884 | A1 | 9/2014 | Bao et al. |
| 2014/0289807 | A1 | 9/2014 | Collado et al. |
| 2014/0365336 | A1 | 12/2014 | Hurewitz |
| 2015/0242622 | A1 | 8/2015 | Xu et al. |
| 2015/0301824 | A1 | 10/2015 | Patton et al. |
| 2016/0173540 | A1 | 6/2016 | Linden et al. |
| 2016/0261716 | A1 | 9/2016 | Khalaf et al. |
| 2017/0206071 | A1 | 7/2017 | Kirkpatrick |
| 2017/0206090 | A1 | 7/2017 | Kirkpatrick |
| 2017/0206123 | A1 | 7/2017 | Kirkpatrick |
| 2017/0208137 | A1 | 7/2017 | Kirkpatrick et al. |
| 2018/0060055 | A1* | 3/2018 | Kirkpatrick ............... G06F 8/61 |
| 2019/0155667 | A1 | 5/2019 | Kirkpatrick et al. |

FOREIGN PATENT DOCUMENTS

| | | |
|---|---|---|
| JP | 2006259806 A | 9/2006 |
| JP | 2008090578 A | 4/2008 |
| KR | 1020070109310 A | 11/2007 |
| WO | 2011080615 A1 | 7/2011 |
| WO | 2013101950 A1 | 7/2013 |
| WO | 2014193434 A1 | 12/2014 |

OTHER PUBLICATIONS

Notice of Allowance from U.S. Appl. No. 15/406,511, dated May 24, 2018, 7 pp.
International Preliminary Report on Patentability from International Application No. PCT/US2017/013542, dated Mar. 29, 2018, 8 pp.
"6.The IoC container," The Spring Framework, retrieved on Jan. 8, 2016, from http://docs.spring.io/spring/docs/current/spring-framework-reference/html/beans.html, 152 pp.
Escoffier et al., "iPOJO: an Extensible Service-Oriented Component Framework," IEEE International Conference on Services Computing, Grenoble University, Jul. 9-13, 2007, 8 pp.
Buck et al., "An API for Runtime Code Patching," International Journal of High Performance Computing Applications, vol. 14 Issue 4, Nov. 2000, pp. 317-329.
"App Container Image," GitHub, Inc., retrieved on Dec. 9, 2015, from https://github.com/appc/spec/blob/master/spec/aci.md, 7 pp.
"App Container Specification," GitHub Inc., retrieved on Jun. 11, 2015, from https://github.com/appc/spec/blob/master/SPEC.md#app-container-image, 2 pp.
"App Container Pods," GitHub Inc., retrieved on Dec. 9, 2015, from https://github.com/appc/spec/blob/master/spec/pods.md, 5 pp.
Jianhui et al., "Run-Time Data-Flow Analysis," Journal of Computer Science & Technology, vol. 17 Issue 4, Jul. 2002, pp. 442-449.
"App Thinning (iOS, tvOS, watchOS)," Apple Inc., Oct. 21, 2015, from https://developer.apple.com/library/watchos/documentation/IDEs/Conceptual/AppDistributionGuide/AppThinning/AppThinning.html, 4 pp.
Solomon, "App Thinning in IOS 9 & NSBundlerSourceRequest," Mutual Mobile, Nov. 5, 2015, https://mutualmobile.com/posts/app-thinning-in-ios-9-nsbundleresourcerequest, 7 pp.
"Accessing and Downloading On-Demand Resources," Apple Inc., Oct. 21, 2015, from https://developer.apple.com/library/ios/documentation/FileManagement/Conceptual/On_Demand_Resources_Guide/Managing.html, 7 pp.
"On-Demand Resources Essentials," Apple Inc., Oct. 25, 2015, from https://developer.apple.com/library/ios/documentation/FileManagement/Conceptual/On_Demand_Resources_Guide/index.html#//apple_ref/doc/uid/TP40015083 . . . , 6 pp.
Allen et al., "Serialization Sets: A Dynamic Dependence-Based Parallel Execution Model," Principles and Practice of Parallel Programming, vol. 44 Issue 4, Apr. 2009, pp. 85-96.
Tarantino, "Prefetching/Preloading and Prerendering content with HTML," Blog: Jack of Spades https://jack.ofspades.com/prefetching-preloading-and-prerendering-content-with-html/, Jan. 4, 2015, 6 pp.
Karle, "Operating System Containers vs. Application Containers," Rising Stack Engineering, May 19, 2015, 13 pp.
"Docker Engine," Docker Inc., retrieved on Jan. 25, 2017, from https://www.docker.com/, 10 pp.
"Modern Application Architecture for the Enterprise | Delivering agility, portability, and control with Docker Containers as a Service (CaaS)," Docker Inc., Jan. 21, 2016, 6 pp.
Engberg et al., "Privacy Authentication—Persistent Non-Identification in Ubiquitous Environments," Open Business Innovation, Aug. 18, 2002, 6 pp.
Shende, "Enhancing Privacy in Intercloud Interaction," IRF International Conference, Apr. 27, 2014, 185 pp.
"About Bundles," Apple Inc., Jun. 30, 2015, from https://developer.apple.com/library/mac/documentation/CoreFoundation/Conceptual/CFBundles/AboutBundles/AboutBundles.html, 6 pp.
"12 Applet Development Guide," Oracle Inc., retrieved on Dec. 29, 2015, from https://docs.oracle.com/javase/8/docs/technotes/guides/deploy/applet_dev_guide.html, 13 pp.
"Class Loading," Oracle Inc., retrieved on Dec. 29, 2015, from http://docs.oracle.com/javase/jndi/tutorial/beyond/misc/classloader.html, 4 pp.

(56) References Cited

OTHER PUBLICATIONS

"Docker (software)," Wikipedia, retrieved on Dec. 29, 2015, from https://en.wikipedia.org/wiki/Docker_(software), 6 pp.
"Is Applet jar downloaded by browser or by JVM?," Stack Overflow, Jun. 25, 2011, from http://stackoverflow.com/questions/6475838/is-applet-jar-downloaded-by-browser-or-by-jvm, 2 pp.
Venners, "Security and the Class Loader Architecture," JavaWorld, Aug. 1997, http://www.artima.com/underthehood/classloaders.html, 9 pp.
McGraw et al., "The Base Java Security Model: The Original Applet Sandbox," Ch. 2 Sec. 7, John Wiley & Sons, Inc., retrieved on Jan. 25, 1997, from http://www.securingjava.com/chapter-two/chapter-two-7.html, 7 pp.
Kleyman, "Understanding Application Containers and OS-Level Virtualization," Data Center Knowledge, retrieved on Jan. 5, 2015, from http://www.datacenterknowledge.com/archives/2015/01/05/understanding-application-containers-and-os-level-virtualization/, 3 pp.
"Multi Class Java Applet," Stack Overflow, Mar. 14, 2011, from http://stackoverflow.com/questions/5294872/multi-class-java-applet/2#2, 2 pp.
Vaughn-Nichols, "What is Docker and why is it so darn popular," ZDNet, Aug. 4, 2014, retrieved from http://www.zdnet.com/article/what-is-docker-and-why-is-it-so-darn-popular/, 10 pp.
Horstmann et al, "Core JAVA 2 vol. 1—Fundamentals," Sun Microsystems Inc., Dec. 18, 2000, pp. 624.
"NSBundleResourceRequest," Apple Inc., Sep. 16, 2015, from https://developer.apple.com/library/ios/documentation/Foundation/Reference/NSBundleResourceRequest_Class/, 2 pp.
U.S. Appl. No. 15/406,511, filed by Kirkpatrick, filed Jan. 13, 2017.
U.S. Appl. No. 15/406,520, filed by Kirkpatrick, filed Jan. 13, 2017.
U.S. Appl. No. 15/406,527, filed by Kirkpatrick, filed Jan. 13, 2017.
U.S. Appl. No. 14/997,167, filed by Kirkpatrick, filed Jan. 15, 2017.
International Search Report and Written Opinion of International Application No. PCT/US2017/013542, dated Mar. 30, 2017, 15 pp.
Response to Written Opinion dated Mar. 30, 2017, from international application No. PCT/US2017/013542, filed Nov. 6, 2017, 11 pp.
Second Written Opinion of International Application No. PCT/US2017/013542, dated Dec. 15, 2017, 7 pp.
Notice of Allowance from U.S. Appl. No. 15/406,511, dated Mar. 14, 2018, 9 pp.
Kinney, "Getting started with Microsoft Application Virtualization", TechNet Magazine Nov. 2008. Retrieved from the Internet: <https://technet.microsoft.com/en-us/library/2008.10.appv.aspx?f=255&MSPPError=-2147217396> 4 pp.
"Microsoft App-V," Wikipedia, the free encyclopedia, revised on Jan. 29, 2010. Retrieved from the Internet: <https://en.wikipedia.org/wiki/Microsoft_App-V> 5 pp.
Yang et al., "Application Streaming: A Mobile Application Distribution Method", School of Information Science and Engineering, Central South University, Dec. 16, 2015. Retrieved from the Internet: <https://link.springer.com/chapter/10.1007/978-3-319-27119-4_21> 14 pp.
Kircher et al., "Pooling", Corporate Technology, Siemens AG, May 10, 2003. Retrieved from the Internet: <http://www.kircher-schwanninger.de/michael/publications/Pooling.pdf> 11 pp.
U.S. Appl. No. 16/254,526, filed Jan. 22, 2019.
U.S. Appl. No. 16/540,846, filed by Kirkpatrick et al., filed Aug. 14, 2019.
Notice of Allowance from U.S. Appl. No. 16/254,526, dated Sep. 10, 2019, 7 pp.

\* cited by examiner

APPLICATION CONTAINERS WITH UPDATABLE APPLICATION PROGRAMMING INTERFACE LAYERS

This application claims the benefit of U.S. Provisional Patent Application No. 62/279,571, filed Jan. 15, 2016, the entire content of which is hereby incorporated by reference.

BACKGROUND

Computing devices can perform various functions, such as executing applications, receiving user input, and outputting information for display. For instance, computing devices may execute applications, such as an email client, travel assistant, messaging client, and the like. Software developers may rely upon code reuse when writing such applications to speed up and simplify development of the applications. Typically, in order to incorporate existing code into the applications, the developer needs to use static linking, shared libraries, or updatable services. Each technique has various drawbacks, such as requiring support by the underlying operating system onto which the application is installed, only being able to update the reused code when the application is compiled into machine-readable code, or lack of support across a large variety of computing devices onto which the application is installed.

SUMMARY

In general, techniques of the present disclosure provide for an updatable runtime application container for application code without requiring modification to the underlying operating system. To the operating system, the application container appears to be the application itself even though, without any application code executing within the application container, the application container is not a functional application. The application container provides a number of different application programming interfaces (APIs) usable by a developer when writing an application. That is, the developer may avoid relying upon APIs provided by the underlying operating system or by shared libraries and may avoid statically linking various libraries at compile time. Instead, the developer may assume that the APIs provided by the application container are invariant and the application container itself manages the application dependencies, shared library updates, and the like. Further, by proxying the API calls made by the application, the application container may validate the API calls, which may increase the security of a computing system that incorporates the techniques of this disclosure.

In some examples, the application container may provide a self-contained execution environment for an application comprised of multiple sub-packages and each sub-package includes one or more executable components. As an example, a software developer may design an application (e.g., a navigation application) with discrete sets of functionality. The navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface. However, because each of the sub-packages operate within the same application container, the sub-packages can communicate with other sub-packages as if they are included within a single sub-package. In contrast, distinct application containers communicate as completely distinct applications using inter-process communication.

In some examples, a method includes receiving, by a supervisor component executing at a computing device, a request to execute an application, and, responsive to receiving the request, identifying, by an application container for maintaining installable sub-packages of the application, a minimum version of a library specified in an application definition of the application. The method may further include, responsive to determining that the application container does not include the minimum version of the library: retrieving an instance of the library with a version that is greater than or equal to the minimum version, installing the instance of the library in the container runtime of the application container, and executing the application using the instance of the library in the container runtime.

In some examples, a computing device includes one or more computer processors; and a memory that stores instructions for a supervisor component and an application container for an application. The supervisor component, when executed by the one or more computer processors, causes the one or more computer processors to receive a request to execute the application. The application container, when executed by the one or more computer processors, causes the one or more computer processors to identify a minimum version of a library specified in an application definition of the application, and, responsive to determining that the application container does not include the minimum version of the library: identify a minimum version of a library specified in an application definition of the application, retrieve an instance of the library with a version that is greater than or equal to the minimum version, install the instance of the library in the container runtime of the application container, and execute the application using the instance of the library in the container runtime.

A non-transitory computer-readable storage medium encoded with instructions that, when executed, cause at least one processor of a computing device to receive a request to execute an application, and responsive to receiving the request, identify a minimum version of a library specified in an application definition of the application. The instructions may further cause the one or more processors to, responsive to determining that the application container does not include the minimum version of the library: retrieve an instance of the library with a version that is greater than or equal to the minimum version, install the instance of the library in the container runtime of the application container, and cute the application using the instance of the library in the container runtime.

In some examples, an apparatus comprises means for receiving request to execute an application, means for, responsive to receiving the request, identifying a minimum version of a library specified in an application definition of the application, and means for, responsive to determining that the application container does not include the minimum version of the library, retrieving an instance of the library with a version that is greater than or equal to the minimum version, installing the instance of the library, and executing the application using the instance of the library.

The details of one or more examples are set forth in the accompanying drawings and the description below. Other features, objects, and advantages of the disclosure will be apparent from the description and drawings, and from the claims.

DETAILED DESCRIPTION

Figure 1:
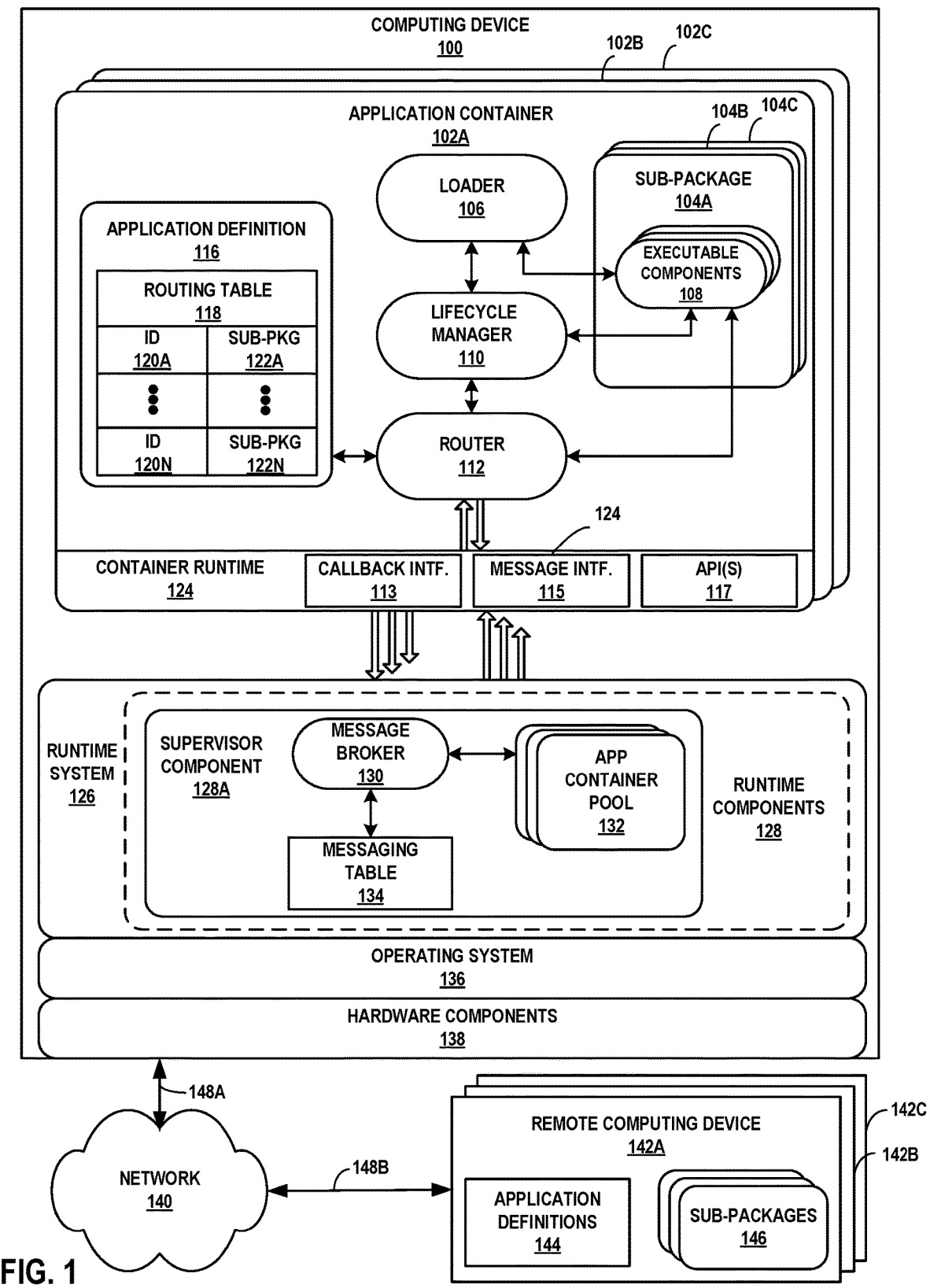
FIG. 1 is a conceptual diagram illustrating an example computing device with application containers with updatable application programming interface layers, in accordance with techniques of this disclosure.

FIG. 1 is a conceptual diagram illustrating an example computing device 100 with application containers 102A-102C ("application containers 102") with updatable application programming interface layers, in accordance with techniques of this disclosure. Examples of computing device 100 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 100 may include stationary computing devices such as desktop computers, servers, mainframes, etc.

As shown in FIG. 1, computing device 100 includes application containers 102, system runtime 126, operating system 136, and hardware components 138. Computing device 100 may communicate with one or more other remote computing devices 142A-142C ("remote computing devices 142") via network 140 and communication links 148A-148B. As shown in FIG. 1, network 140 represents any public or private communication network, for instance, a cellular, Wi-Fi, and/or other type of network for transmitting data between computing devices. Computing device 100 and remote computing devices 142 may send and receive data across network 140 using any suitable communication techniques. For example, computing device 100 may be operatively coupled to network 140 using communication link 148A. Remote computing device 142A may be operatively coupled to network 140 by communication link 148B. Network 140 may include network hubs, network switches, network routers, etc., that are operatively inter-coupled thereby providing for the exchange of information between computing device 102 and remote computing devices 142. In some examples, communication links 138A-138B may be Ethernet, ATM or other network connections. Such connections may be wireless and/or wired connections.

Hardware components 138 may include but are not limited to computer processors, communication units (e.g., modems, network interface controllers, and the like), input components, output components, a presence-sensitive display, volatile and non-volatile memories, and a power source to name only a few examples. Operating system 136 may execute on hardware components 138 and manage hardware and software components of computing device 100. For instance, operating system 136 may perform memory management, process scheduling and non-volatile storage management. Operating system 136 may also provide network and security services to applications executing at computing device 100. Operating system 136 may also perform more or fewer functions than described above.

Runtime system 126 implements an execution model for applications that are built according to a particular programming language in which the applications are written and built or compiled. Runtime system 126 may include one or more libraries and/or services that are accessible to application containers 102 during execution. As further described in this disclosure, each application container 102 may correspond to a distinct application. Runtime system 126 may include thread-management services, screen drawing and user-interface rendering component, and inter- and intra-application messaging services to name only a few example services. Application containers 102 may access the services through Application Programming Interfaces (APIs) that are exposed by runtime components 128. In some examples, runtime system 126 may be executed as one or more processes and/or threads. One or more of the processes and/or threads may execute with or without operating system privileges.

As shown in FIG. 1, runtime system 126 may include runtime components 128. Each distinct runtime component may be implemented with one or more processes and/or threads. In some examples, each distinct runtime component may provide a user-defined set of functionality. For instance, a user-interface rendering component may be implemented with one or more libraries that define user-interface elements (e.g., buttons, lists, images, input fields, and the like) and their corresponding behaviors. The user-interface rendering component may provide APIs, which are called by application containers 102 to render the user-interface elements in a graphical user interface.

Supervisor component 128A is included in runtime components 128. Supervisor component 128A performs installation and maintenance of application containers 102 and provides inter- and intra-application messaging services. Supervisor component 128A includes a message broker 130 that listens for messages generated by application containers 102 and performs actions for the sending application container or one or more other application containers. Supervisor component 128A may have first priority or the first opportunity at dispatching any message (e.g., a message containing a URI as a user-specified identifier). In some examples, message broker 130 may provide additional processing for messages, such as allocating application containers from application container pool 132, enforcing security for messages, and logging messages, to name only a few examples. As an example, application container 102A may generate a message to navigate from a first user interface to a second user interface within the same application. Application container 102A may send the message to message broker 130, which includes a messaging table 134 comprising a set of filters, where each filter has one or more conditions and one or more corresponding actions. If the content of the message matches a condition of a filter, message broker 130 may execute the corresponding action, such as executing instructions to output the second graphical user interface. In some examples, such messages described above may be routed internally by router 112 without forwarding the messages to message broker 130.

In some examples, supervisor component 128A ensures that at least one application container is included in application container pool 132 and ready to be woken up. Each application container included in application container pool 132 are not currently allocated to a particular application and are not currently executing application code. However, each application container included in application container pool 132 includes enough bootstrapping code to be able to load and run application code when supervisor component 128A wake up the particular application container and assigns the particular application container to a particular application. The particular application container from application container pool 132 receives instructions from supervisor component 128A to begin loading and running the application code for the particular application.

As described above, each of application containers 102 may correspond to a distinct application. Applications may include distinct functionality to perform operations on computing device 100. In various instances, supervisor component 128A maintains a mapping of which application containers are mapped to which executing applications. Applications may include distinct functionality to perform operations on computing device 100. For instance, applications may include an email application, text messing application, instant messaging application, weather application, video conferencing application, social networking application, weather application, stock market application, emergency alert application, sports application, office productivity application, multimedia player, to name only a few examples.

As a user or operating system invokes particular applications, supervisor component 128A dynamically allocates application containers 102 from application container pool 132 and maintains a mapping of the particular application containers 102 to the corresponding applications. When an application is terminated, supervisor component 128A may clean up any application containers 102 that are no longer needed. For example, supervisor component 128A may reset a state of an application container 102 or may uninstall the application container 102 that was mapped to a now terminated application. In examples where supervisor component 128A uninstalls application containers 102 that are no longer mapped to an actively executing application, supervisor component 128A may install new applications containers and add them to application container pool 132 to ensure that at least one application container is ready to be woken up in response to invocation of an application. In this way, the user-interactive latency of application installation may be reduced to zero or nearly zero while, from the operating system perspective, maintaining separate identities for each application.

As shown in FIG. 1, application container 102A provides an execution environment and supporting services to direct the execution of executable components 108 of an application. Application containers 102 may execute as separate processes in operating system 136. In some examples, application container 102A includes a messaging interface 115. Router 112 may receive messages from runtime system 126 via messaging interface 115, and runtime system 126 may receive messages from executable components 108 and router 112 via messaging interface 115. Program logic for application container 102A may be implemented in executable components 108. An executable component may be a logical grouping of machine-executable code. For instance, in object-oriented design, a single executable component may be a single, compiled class file that includes machine-executable code.

Application container 102A may be a vessel for one or more sub-packages 104. In some examples, a sub-package includes two or more executable components 108. A sub-package may include resources (e.g., images, text, videos or any other non-compiled data), security and/or signing information, version information and/or dependency information (e.g., minimum version of a library required), or any other information for an application. A software developer may design an application to be comprised of multiple, user-defined sub-packages. Each user-defined sub-package may include set of executable components that collectively provide a discrete set of functionality. For instance, a software developer may design a navigation application with multiple different user interfaces. Each user interface may include a different set of user interface elements and corresponding behaviors. As such each user interface may be implemented with a distinct set of executable components. For instance, the navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface.

Application container 102A may include container runtime 124. Container runtime 124 may include one or more libraries and/or one or more Application Programming Interfaces (APIs) 117 to services and/or functions that are provided by libraries within container runtime 124, runtime system 126, and/or operating system 136. As such, container runtime 124 may provide a secure in-process API layer. That is, each application container 102 shares a process and address space with the application code for the particular application to which the application container is mapped. By sharing the process and address space, application container 102 may simplify method call semantics between application code and shared API code. That is, rather than requiring a developer to use blocking interprocess communication calls, the developer may directly utilize APIs 117.

By controlling the application container and container runtime, runtime system 126 can proxy API calls and verify that application container and container runtime have not been tampered with and therefore provide runtime logic for sensitive behavior. For instance, an application that requests access a user's device identifier (e.g., a globally unique identifier of the device) could be required to call through APIs of the container runtime, which could then check with supervisor component 128A to ensure this is allowed behavior or even to modify the output of that API (by, for example, scrubbing or pseudonymizing personally identifying information). If the API call is not permitted, supervisor component 128A may drop the API call without actually calling the API or executing the functionality provided by the API that was called. If the API call is permitted, container runtime 124 may determine whether one or more parameters of the application programming interface call are valid parameters, in response to determining that the one or more parameters are valid, pass the API call to operating system 136. That is, if the API call is permitted, container runtime 124 may validate the parameters of the API call, and if the parameters are valid, container 124 may actually perform the API call by passing the API call to operating system 126.

In general, application containers 102 may permit some direct access to operating system 136, may permit some indirect action via the proxying, and may also block access to certain APIs. In this way, container runtime 124 may enforce a guarantee that such checks occur various operations because such operations could only be made through APIs of container runtime 124. Further, because container runtime 124 of application containers 102 provide APIs 117, updates to application containers 102 may be performed an application update rather than requiring an update to the underlying operating system 136, which may increase the adoption rate of any such updates, which may, in turn, increase security of the operating platform.

Container runtime 124 may identify a minimum version of a library specified in the application definition and, if needed, updated any libraries that may already be stored at computing device 100 to satisfy the minimum version required. Prior to executing the application using the runtime container, container runtime 124 may retrieve an instance of the library with a version that is greater than or equal to the minimum version and install the instance of the library in a container runtime of the application container. Thus, when application container 102A executes the particular functionality of the application, application container 102A executes the particular functionality using the instance of the library in the container runtime.

As further described below, by allowing the software developer to design an application with separate sub-packages for separate sets of functionality, application containers 102 may enable an application to execute at computing device 100 without all of its respective execution components for all of its sub-packages being locally resident on computing device 100. In this way, the initial execution of an application may not require the retrieval and/or installation of all sub-packages but rather only a subset of sub-packages that include executable components implementing the requested functionality. Moreover, by packaging multiple, executable components in a single sub-package, the retrieval and/or installation of executable components may occur on a sub-package basis according to requested functionality (e.g., to render a particular user interface) rather retrieving and installing executable components on an executable component-by-executable component basis, which may have poorer performance and/or result in a poorer user experience.

Each application may be executed with an application container that includes one or more executable components that define the operations of the application. Application container 102A includes a router 112 that sends and receives messages, which change the behavior of the application and/or cause the application to perform one or more operations, with executable components 108 and messaging interface 115. For instance, router 112 may receive a message that requests the execution of one or more operations. Router 112 may determine, based on the contents of the message, whether a sub-package that includes executable components to perform the one or more operations are stored locally or are otherwise accessible on computing device 100. The contents of the message may include an identifier such as a Uniform Resource Identifier (URI) that corresponds to the sub-package. If the sub-package is stored locally or is otherwise accessible on computing device 100, then router 112 identifies one or more executable components to perform the operations based on contents of the message. In some examples, the message may include additional attributes (e.g., category for launching user interface, MIME type of data, explicit component class for execution) or data (e.g., user data or machine generated data) that further specify the one or more operations to perform. As such, the one or more executable components identified by router 112 may perform the one or more operations based on the additional attributes or data.

All of the sub-packages for a particular application need not be locally resident at computing device 100 to execute the application. To determine whether a sub-package for specific functionality is resident or otherwise accessible at computing device 100, router 112 may perform a lookup on application definition 116. Application definition 116, generally, may define mappings between user-specified identifiers (e.g., URIs, strings, integers, or any other suitable identifier) and sub-packages that specify specific functionality for the application. Application definition 116 includes these mappings in routing table 118, which includes mappings between user-specified identifiers 120A-120N ("user-specified identifiers 120") and sub-package identifiers 122A-122N ("sub-package identifiers 122"). If router 112 receives a message with a user-specified identifier to perform functionality using a particular sub-package, router 112 may perform a lookup in router table 118 (i.e., query router table 118). If router 112 determines that user-specified identifier 120A, for example, matches the user-specified identifier in the message, router 112 may determine whether sub-package 104A that corresponds to sub-package identifier 122A is resident on computing device 100. Since sub-package 104A is resident on computing device 100, router 112 executes a call to sub-package 104A based on the message or sends the message to sub-package 104A, which performs one or more operations using executable components 108A.

In some examples, because the entire set of sub-packages for an application need not be stored locally on computing device 100, the initial installation and/or initial execution of an application at computing device 100 may require less time than if the entire application needed to be downloaded from a remote computing device, installed, and executed by computing device 100. As such, a user may experience greater responsiveness from the application and/or performance for the behavior of the application.

In the example of FIG. 1, a user may desire to initially install and execute the navigation application as described above. Initially, none of the sub-packages or the application definition for navigation application may be stored at computing device 100. The user may provide a user input to computing device 100 to initially select an icon in a user interface provided by operating system 136 that corresponds to the map application. Alternatively, the user may select the map application in a media store application (not shown) that executes at computing device 100 and communicates with remote computing devices 142 to retrieve sub-packages and application definitions. In any case, message broker 130 of supervisor component 128A receives a message from operating system 136 or the media store application that requests execution of the navigation application or particular functionality of the navigation application. Because the navigation application is not yet installed, the particular functionality requested is to display the default or main user interface for the application.

Supervisor component 128A may determine whether an application container has already been allocated in the memory of computing device 100 for the navigation application based on the content of the message. For instance, the content of the message may include a unique identifier of the navigation application, such as name for the application. In response to determining that supervisor component 128A has not yet allocated an application container for the navigation application, supervisor component 128A may allocate an application container 102A from application container pool 132. Application container pool 132 may include a set of processes that are reserved for and usable to execute applications. In some examples, supervisor component 128A may communicate with operating system 136 to create a new process for application container 102A.

Supervisor component 128A may determine that the navigation application is not yet installed and request an application definition from one or more of remote computing devices 142. For instance, supervisor component 128A may send a message to remote computing device 142A, where the message includes an identifier for the navigation application that is globally unique in remote computing devices 142. Remote computing device 142A, upon receiving the message, selects application definition 116 from application definitions 144, and sends application definition 116 to computing device 100. Supervisor component 128A receives application definition 116, which may be included in or accessible to application container 102A.

Supervisor component 128A causes message broker 130 to send a message to application container 102A to display the default or main user interface for the application. In particular, the message may include a user-specified identifier that corresponds to a sub-package with functionality to display the default or main user interface for the application. In some examples, message broker 130 receives (or generates) the user-specified identifier based on information received from the media store application, or from bootstrapping functionality associated with the icon for the mapping application that was initially selected by the user. The bootstrapping functionality may include, but is not limited to, sending the user-specified identifier to message broker 130.

Router 112 receives the message with the user-specified identifier via messaging interface 115. In this example of FIG. 1, the user-specified identifier is 120A. Based on the user-specified identifier, router 112 determines that the sub-package for sub-package identifier 122A corresponding to user-specified identifier 120A is not stored locally at computing device 100. Router 112 may send a message, using container runtime 124 and/or runtime system 126, to remote computing device 142A to request the sub-package for sub-package identifier 122A. For instance, the message sent by container runtime 124 and/or runtime system 126 to remote computing device 142A may include sub-package identifier 122A. Remote computing device 142A may send a sub-package to computing device 100 comprising executable components for displaying the default or main user interface of the navigation application.

Router 112, in response to determining that the sub-package for sub-package identifier 122A is not stored locally, may cause lifecycle manager 110 to listen for system lifecycles calls via callback interface 113, where the lifecycle calls are issued by runtime system 126. Lifecycle calls may include starting an application, pausing an application, restarting an application, or terminating an application, to name only a few examples. Lifecycle manager 110 may buffer the lifecycle calls, which will be executed by the executable components of sub-package 104A, once computing device 100 has retrieved sub-package 104A from remote computing device 142A. Once sub-package 104A has been retrieved by computing device 100, lifecycle manager 110 may send each of the buffered lifecycle calls to sub-package 104A.

In the example of FIG. 1, in response to lifecycle manager 110 determining that computing device 100 has retrieved and stored sub-package 104A locally, lifecycle manager 110 sends a call or otherwise invokes loader 106 to load one or more of executable components 108 into memory of computing device 100 in order to execute the particular functionality initially requested, e.g., display the default or main user interface for the application. In some examples, loader 106 is responsible for loading executable components into memory. In some examples, loader 106 may represent multiple loaders, where each loader is responsible for loading a different executable component into memory. Loader 106 may, for a particular executable component, locate corresponding libraries used by the particular executable component and load any such libraries into memory, such that the libraries are accessible to the particular executable component. Lifecycle manager 110 may also send the buffered lifecycle calls to one or more of executable components 108. Upon receiving the buffered lifecycle calls, the one or more of executable components 108 cause computing device 100 to display the default or main user interface for the application.

At a later time, if the user wishes to navigate to a settings user interface, the user may provide a user input that selects a user interface element (e.g., icon, button, label, or the like) for the settings in the currently displayed default or main user interface for the application. Runtime system 126 sends a message to application container 102A that indicates the selection of the user interface element. Executable component 108A determines that the selection displays the settings user interface. Executable component 108A generates a message with a user-specified identifier 120N for sub-package 122N that includes the functionality for the settings user interface. Executable component 108A may send the message to router 112 directly, or to runtime system 126, which in turn routes the message back to router 112. In either case, router 112 performs a lookup of user-specified identifier 120N and determines that the sub-package for sub-package identifier 122N is not locally stored at computing device 100.

In a similar to manner, as described above with respect to sub-package 104A, router 112 sends a message, using container runtime 124 and/or runtime system 126, to remote computing device 142A to retrieve the sub-package for sub-package identifier 122N. Remote computing device 142A may send sub-package 122N to computing device 100 comprising executable components for displaying the settings interface of the navigation application. While computing device 100 is retrieving sub-package 122N, lifecycle manager 110 may buffer lifecycle calls received at callback interface 113. Upon downloading sub-package 122N, lifecycle manager 110 causes loader 106 to load executable components of sub-package 122N into memory. Loader 106 may initiate execution of one or more of the executable components to cause the settings interface of the navigation application to be displayed at a display device of computing device 100.

Figure 2:
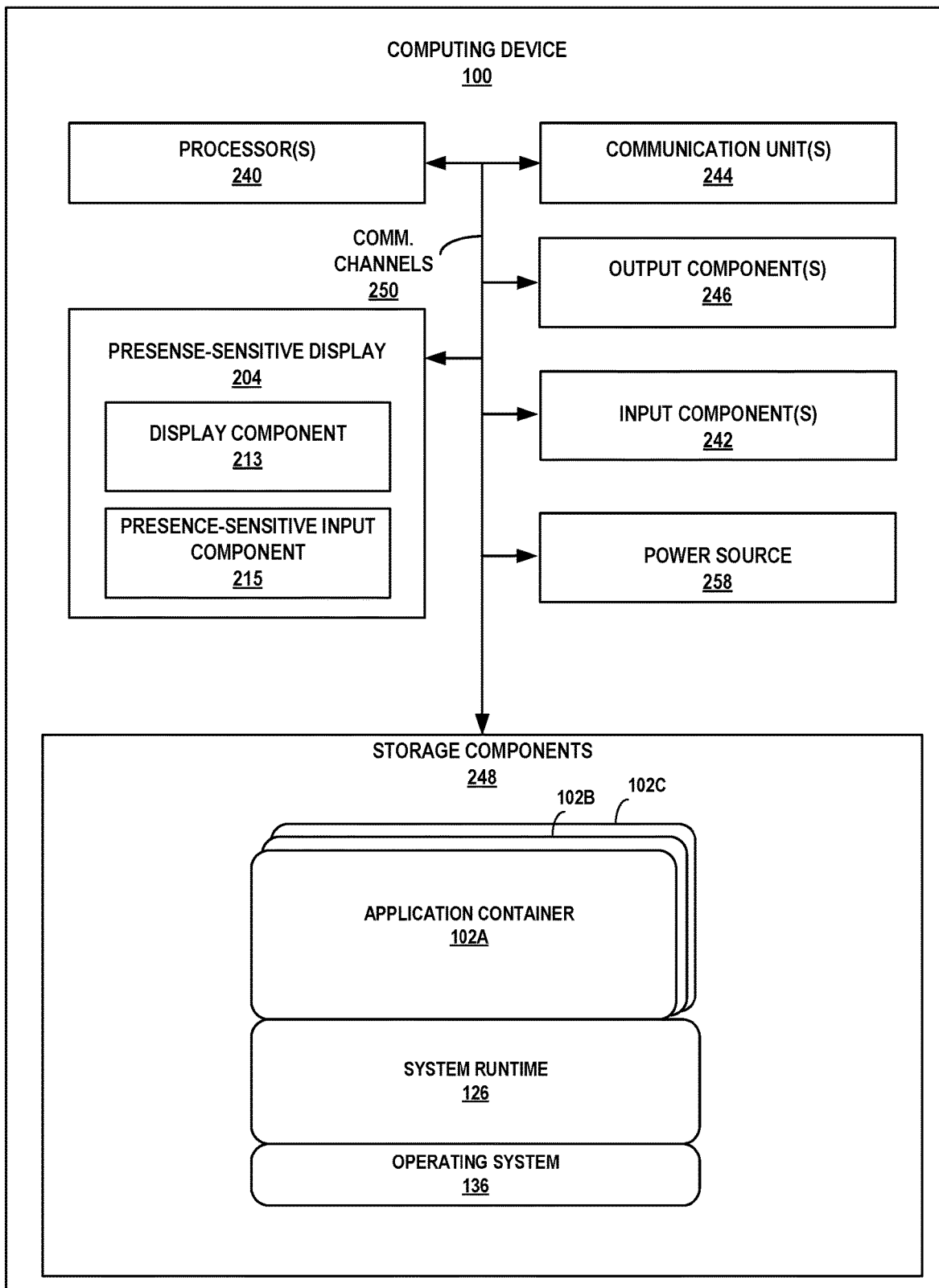
FIG. 2 is a block diagram illustrating further details of a computing device, in accordance with one or more aspects of the present disclosure.

FIG. 2 is a block diagram illustrating further details of computing device 100, in accordance with one or more aspects of the present disclosure. FIG. 2 illustrates only one particular example of computing device 100. Many other examples of computing device 100 may be used in other instances and may include a subset of the components included in example computing device 100 or may include additional components not shown example computing device 100 in FIG. 2.

As shown in the example of FIG. 2, computing device 100 includes one or more processors 240, one or more input components 242, one or more communication units 244, one or more output components 246, one or more storage devices 248, and presence-sensitive display 252. Storage devices 248 of computing device 100 include application containers 102, system runtime 128, and operating system 136. Communication channels 250 may interconnect each of the components 240, 242, 244, 246, 248, 252, 254, and/or 256 for inter-component communications (physically, communicatively, and/or operatively). In some examples, communication channels 250 may include a system bus, a network connection, one or more inter-process communication data structures, or any other components for communicating data between hardware and/or software.

One or more processors 240 may implement functionality and/or execute instructions within computing device 100. For example, processors 240 on computing device 100 may receive and execute instructions stored by storage devices 248 that provide the functionality of operating system 136, application containers 102, and system runtime 126. These instructions executed by processors 240 may cause computing device 100 to store and/or modify information, within storage devices 248 during program execution. Processors 240 may execute instructions of operating system 136, application containers 102, and system runtime 126 to perform one or more operations. That is, operating system 136, application containers 102, and system runtime 126 may be operable by processors 240 to perform various functions described in this disclosure.

One or more input components 242 of computing device 100 may receive input. Examples of input are tactile, audio, kinetic, and optical input, to name only a few examples. Input components 242 of computing device 100, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 246 of computing device 100 may generate output. Examples of output are tactile, audio, and video output. Output components 246 of computing device 100, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 252 of computing device 100 may include functionality of input component 242 and/or output components 246. In the example of FIG. 2, presence-sensitive display 252 may include a presence-sensitive input component 256, such as a presence-sensitive screen or touch-sensitive screen. In some examples, presence-sensitive input component 256 may detect an object at and/or near the presence-sensitive input component. As one example range, presence-sensitive input component 256 may detect an object, such as a finger or stylus that is within two inches or less of presence-sensitive input component 256. Presence-sensitive input component 256 may determine a location (e.g., an (x,y) coordinate) of the presence-sensitive input component at which the object was detected. In another example range, presence-sensitive input component 256 may detect an object two inches or less from presence-sensitive input component 256 and other ranges are also possible. Presence-sensitive input component 256 may determine the location of presence-sensitive input component 256 selected by a user's finger using capacitive, inductive, and/or optical recognition techniques.

In some examples, presence-sensitive display 252 may also provide output to a user using tactile, audio, or video stimuli as described with respect to output component 246. For instance, presence-sensitive display 252 may include display component 254 that presents a graphical user interface. Display component 254 may be any type of output component that provides visual output, such as described with respect to output components 246. While illustrated as an integrated component of computing device 100, presence-sensitive display 252 may, in some examples, be an external component that shares a data path with other components of computing device 100 for transmitting and/or receiving input and output. For instance, presence-sensitive display 252 may be a built-in component of computing device 100 located within and physically connected to the external packaging of computing device 100 (e.g., a screen on a mobile phone). In another example, presence-sensitive display 252 may be an external component of computing device 100 located outside and physically separated from the packaging of computing device 100 (e.g., a monitor, a projector, etc. that shares a wired and/or wireless data path with a tablet computer). In some examples, presence-sensitive display 252, when located outside of and physically separated from the packaging of computing device 100, may be implemented by two separate components: a presence-sensitive input component 256 for receiving input and a display component 254 for providing output.

One or more communication units 244 of computing device 100 may communicate with external devices by transmitting and/or receiving data. For example, computing device 100 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g. such as an Ethernet card), an optical transceiver, a radio frequency transceiver, a GPS receiver, or any other type of device that can send and/or receive information. Other examples of communication units 244 may include Bluetooth®, GPS, 3G, 4G, and Wi-Fi® radios found in mobile devices as well as Universal Serial Bus (USB) controllers and the like.

As shown in FIG. 2, computing device 100 may include a power source 258. In some examples, power source 258 may be a battery. Power source 258 may provide power to one or more components of computing device 100. Examples of power source 258 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 258 may have a limited capacity (e.g., 1000-3000 mAh).

One or more storage devices 248 within computing device 100 may store information for processing during operation of computing device 100. In some examples, storage device 248 is a temporary memory, meaning that a primary purpose of storage device 248 is not long-term storage. Storage devices 248 on computing device 100 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 136, system runtime 126, and application containers 102.

Each respective application container 102 may correspond to a distinct application. For instance, an operating system may include a user interface that allows a user to select different applications (e.g., from a menu or icon grid) based on respective icons that correspond to the different applications. For example, a user may select an email client icon from the operating system user interface that causes execution of the email client application with its own separate application container. Unlike an application container, an extension or other sub-application (e.g., plugins, JAVASCRIPT, JAVA VIRTUAL MACHINE, etc.,) of a web-browser may not be represented as a separate application to be launched in a user interface of an operating system. For instance, even if a web browser created a separate process for each tab of a tabbed interface, each of the tabs may not be represented as a separate application within a user interface of the operating system as different launchable applications.

An application container, as described in this disclosure, may differ from a web browser because an application container may include a container runtime. As described in this disclosure, a container runtime of an application container may include libraries, but may also expose operating system APIs to executable components of sub-packages within an application container. Unlike an application container, a web browser may not expose such operating system APIs to extensions or other sub-applications within the web-browser.

An application container, as described in this disclosure, may differ from a web browser because the application container may receive user-specified identifiers (e.g., URI's) from a supervisor component (e.g., in a runtime system or operating system) that is external to the application container that may cause the retrieval of sub-packages that change the execution behavior or appearance of the application without additional user intervention. The user-specified identifiers may originate from other applications executing on the same computing device or different computing devices, and upon being received by an application container may automatically change the execution behavior or appearance of the application. By contrast, a web browser may receive user input (e.g., inputting text for a URL) within the web-browser itself and not from a source external to the application container, e.g., either a supervisor component or another application external to the web-browser. Additionally, a web browser may not include a router and/or application definition, as described within an application container of this disclosure, to perform a lookup of user-specified identifiers and change the execution of the application represented by the application container. Unlike an application container, a web browser may not include a callback interface, which receives and buffers lifecycle calls to change the operation of sub-packages within the application container.

In some examples, a web browser may include core functionality (e.g., rendering engine) and one or more third-party extensions, plugins, and/or sub-application. A web browser, unlike an application container, may not function properly or execute at all without all of the web browser's core functionality being stored locally and available to the computing device for execution. By contrast, an application container may function properly with only a sub-set of its core functionality (e.g., only sub-packages for a subset of user interfaces) stored locally and available to the computing device for execution.

In accordance with techniques of the disclosure, system runtime 126 receives a request to execute an application. For instance, a user may provide a user input at presence-sensitive display 204 to execute the application or particular functionality of the application. Presence-sensitive display 204 may cause system runtime 126 to generate an event that corresponds to selection of an icon for the application.

In response to receiving an indication of the user input, application container 102A for the application may identify a minimum version of a library specified in an application definition of the application. If container runtime 124 does not include the minimum version of the library, application container 102A may retrieve an instance of the library with a version that is greater than or equal to the minimum version and install the instance of the library in container runtime 124. After the library is installed, application container 102A may execute the application using the instance of the library installed in container runtime 124.

Application container 102A may proxy API calls and verify that the application container and the container runtime have not been tampered with and may, therefore, provide runtime logic for sensitive behavior. For instance, an application that requests access a user's device identifier (e.g., a globally unique identifier of the device) could be required to call through APIs of the container runtime, which could then check with a supervisor component to ensure this is allowed behavior or modify the output of that API. If the API call is not permitted, the supervisor component may drop the API call without actually calling the API or executing the functionality provided by the API that was called. If the API call is permitted, the container runtime may determine whether one or more parameters of the application programming interface call are valid parameters, in response to determining that the one or more parameters are valid, pass the API call to operating system 136. That is, if the API call is permitted, the container runtime may validate the parameters of the API call, and if the parameters are valid, the container runtime may actually perform the API call by passing the API call to operating system 126.

Application container 102A may determine a plurality of dependencies for the application or for the particular functionality of the application. For example, application container 102A may parse metadata of the application, such as a manifest file or other information for the application. Based on the configuration file, application container 102A may determine the plurality of dependencies for the application or the particular functionality of the application. As another example, application container 102A may retrieve, from a remote server, dependency information derived from heuristic analysis of the application.

In some examples, the plurality of dependencies may include one or more required dependencies and one or more optional dependencies. A dependency is a required dependency if the dependency is required to execute the application and/or to provide the particular functionality of the application. For example, application container 102A may determine that a sub-package that includes program code for the particular functionality of the application is a required dependency. As another example, if the particular functionality requested by the user is navigation functionality, application container 102A may determine that location information is a required dependency. A dependency is an optional dependency if the dependency is not required to execute the application and/or provide the particular functionality of the application. For example, application container 102A may determine that a dependency is an optional dependency if the dependency is image data for a new story presented by the application. As another example, if the particular functionality requested by the user is information about a particular brand, application container 102A may determine that location information is an optional dependency. However, if the user were to then select find a store functionality of the application, application container 102A may determine that the location information is now a required dependency as the location information may now be required to identify stores located near the current location of computing device 100.

Responsive to determining that one or more required and/or one or more optional dependencies are not currently stored at computing device 100 and/or available to application container 102A, application container 102A initiates retrieval of the one or more required dependencies and/or the one or more optional dependencies. For example, if one of the required dependencies is an installable sub-package for the particular functionality of the application, application container 102A may retrieve the installable sub-package that includes a plurality of executable components from a remote computing device. Similarly, if any of the one or more optional dependencies include information (e.g., textual data, image data, audio data, video data, third-party data, etc.) that is not stored at computing device 100, but is available at a remote computing device, application container 102A may retrieve the data from the remote computing device. The remote computing device may be the same computing device that includes the application definition or a different computing device. In some examples, if the computing devices are different, they may be operated by a common operator. Further, the remote computing device may include two more remote computing devices. In some instances, application container 102A may retrieve the one or more required dependencies from a first data source (e.g., a first remote computing device) and the one or more optional dependencies from a second data source different from the first data source (e.g., a second, different remote computing device).

Once the required dependencies have been received by computing device 100, application container 102A executes the application or the particular functionality of the application required by the user. That is, application container 102A may execute the application and/or the particular functionality of the application even though at least a portion of the one or more optional dependencies have not yet been received. In other words, in response to receiving all of the one or more required dependencies and while at least one of the optional dependencies has not yet been received by application container 102A, computing device 100 may execute the application.

In some examples, computing device 100 begins executing the application prior to receiving all of the optional dependencies, computing device 100 may output, for display (e.g., by presence-sensitive display 252), a graphical user interface of the application including a placeholder graphical element for the at least one of the one or more optional dependencies not yet received by application container 102A. In response to receiving the at least one of the one or more optional dependencies, computing device 100 may output, for display, information associated with the at least one optional dependency in place of the placeholder element.

Figure 3:
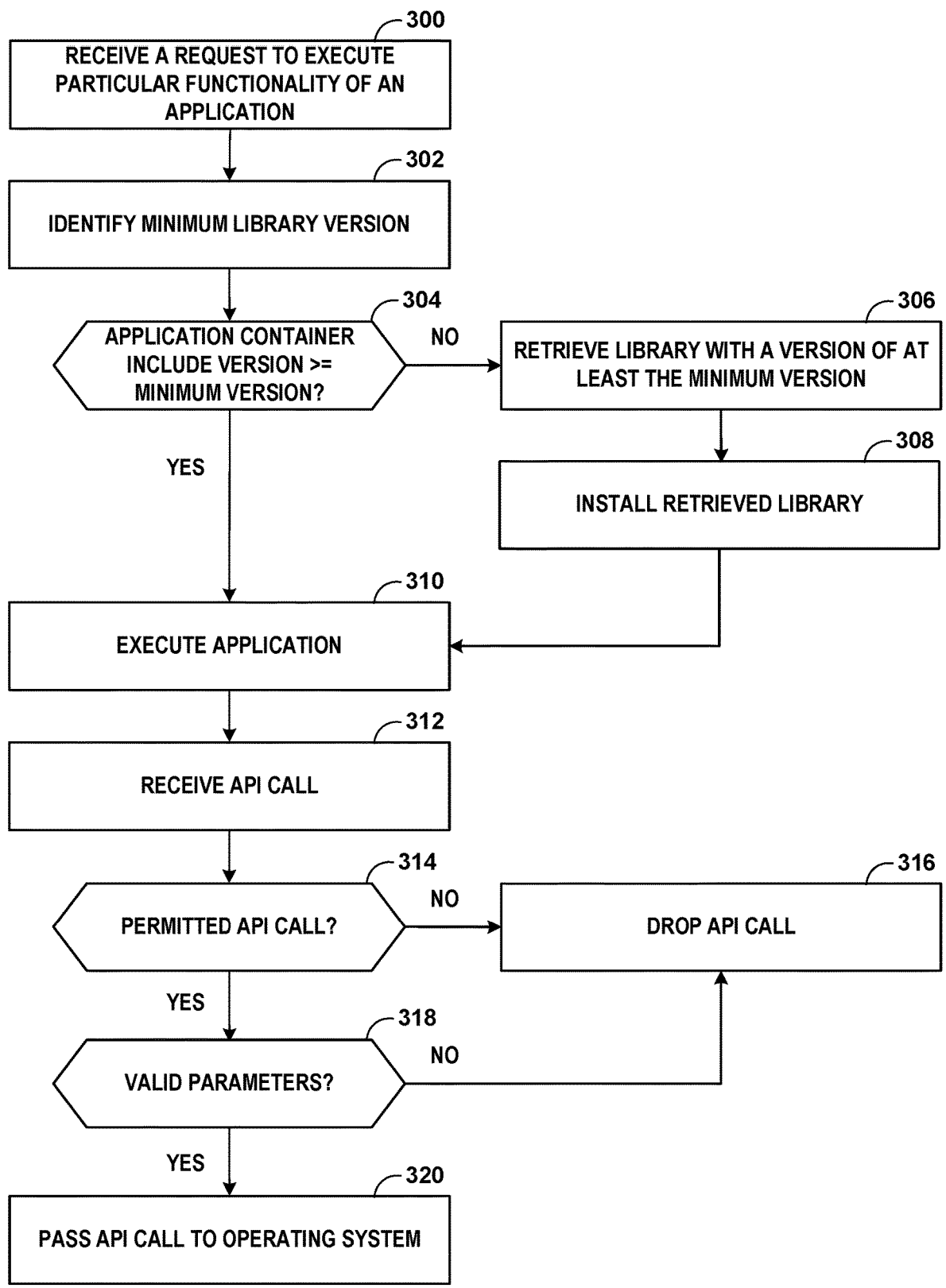
FIG. 3 is a flow diagram illustrating example operations of a computing device with application containers with updatable application programming interface layers, in accordance with techniques of this disclosure.

FIG. 3 is a flow diagram illustrating example operations of a computing device with application containers for dynamically loading installable sub-packages, in accordance with techniques of this disclosure. For purposes of illustration only, the example operations are described below within the context of computing device 100 of FIG. 1.

In FIG. 3, computing device 100 may initially receive a request to execute particular functionality of an application (300). For instance, a user may provide a user input at computing device 100 to launch the application and supervisor component 128A of computing device 100 may receive an indication of the user input as a request to execute the application. Supervisor component 128A may determine whether an application container for maintaining installable sub-packages of the application (e.g., one of application containers 102, such as application container 102A) is allocated in memory (e.g., one of storage components 248 of FIG. 2) of computing device 100 and, if so, initiate execution of the application using application container 102A.

Application container 102A may identify a minimum version of a library specified in an application definition of the application (302). The required version information may be provided by a developer of the application (e.g., in an application configuration file, an manifest file, etc.) or may be determined by analyzing the functionality of the application (e.g., by proxying API calls and determining, based on the API calls, which version of the library is utilized by the application.

Application container 102A may determine if the version of the library installed in container runtime 124 satisfies the minimum version (304). If the version installed at container runtime 124 does not satisfy the minimum version ("NO" branch of 304), application container 102A retrieves an updated version of the library that has at least the minimum version (306) and installed the updated version of the library (308). If the version of the library installed at container runtime 124 satisfies the minimum version ("YES" branch of 304) or after the updated version is installed, application container 102A executes the application using the version of the library installed at container runtime 124 (310).

While executing the application, container runtime 124 may receive API calls from the application (312). Rather than directly passing the API call to operating system 136, container runtime 124 may determine whether the API call is permitted (314). If the API call is not permitted ("NO" branch of 314), container runtime 124 may drop the API call (316), thus preventing the application from accessing the API, which may prevent unauthorized access to information stored at or functionality of computing device 100 and may increase the security of computing device 100.

If container runtime 124 determines that the API call is permitted ("YES" branch of 314), container runtime 124 further validates the parameters of the API call (318). For example, container runtime 124 may determine if the parameters are malformed (e.g., include invalid characters, include too many characters, etc.). If the parameters of the API call are not valid ("NO" branch of 318), container runtime 124 may drop the API call (316), preventing the problematic API call from being executed by operating system 136. If container runtime 124 determines that the parameters are valid, container runtime 124 passes the API call to operating system 136 for execution (320).

Example 1

A method comprising: receiving, by a supervisor component executing at a computing device, a request to execute an application; responsive to receiving the request, identifying, by an application container for maintaining installable sub-packages of the application, a minimum version of a library specified in an application definition of the application; and responsive to determining that the application container does not include the minimum version of the library: retrieving an instance of the library with a version that is greater than or equal to the minimum version; installing the instance of the library in the container runtime of the application container; and executing the application using the instance of the library in the container runtime.

Example 2

The method of example 1, further comprising: receiving, by the container runtime and from the application, an application programming interface call; and determining, by the container runtime, whether the application programming interface call is permitted.

Example 3

The method of example 2, further comprising: responsive to determining that that application programming interface call is not permitted, dropping the application programming interface call.

Example 4

The method of example 2, further comprising: responsive to determining that the application programming interface call is permitted: determining, by the container runtime, whether one or more parameters of the application programming interface call are valid parameters; and responsive to determining that the one or more parameters are valid, passing the application programming interface call to an operating system of the computing device.

Example 5

The method of any combination of examples 1-4, further comprising: determining, by a container runtime of the application container, one or more dependencies of the application; retrieving, by the container runtime, the one or more dependencies; and responsive to retrieving the one or more dependencies, executing, by the application container, the application including the one or more dependencies.

Example 6

The method of example 5, wherein the one or more dependencies comprise required dependencies, the method further comprising: determining, by the container runtime, one or more optional dependencies of the application; and retrieving, by the container runtime, the one or more optional dependencies.

Example 7

The method of example 6, wherein executing the application occurs before at least one of the one or more optional dependencies is received by the container runtime, and wherein executing the application comprises: outputting, by the computing device, for display, a graphical user interface of the application including a placeholder graphical element for the at least one of the one or more optional dependencies not yet received by the container runtime; and responsive to receiving the at least one of the one or more optional dependencies, outputting, by the computing device, for display, information associated with the at least one optional dependency in place of the placeholder element.

Example 8

The method of any combination of examples 1-7, further comprising: receiving, by a router of the application container, a user-specified identifier; querying, by the router of the application container, a router table comprising a plurality of mappings between the installable sub-packages of the application and user-specified identifiers to determine whether an installable sub-package for particular functionality of the application is stored at the computing device; and responsive to determining that the installable sub-package for the particular functionality is not stored locally at the computing device, sending a message that includes an identifier of the installable sub-package to a remote computing device.

Example 9

A computing device comprising: one or more computer processors; and a memory that stores instructions for a supervisor component and an application container for an application, wherein the supervisor component, when executed by the one or more computer processors, causes the one or more computer processors to receive a request to execute the application, and wherein the application container, when executed by the one or more computer processors, causes the one or more computer processors to identify a minimum version of a library specified in an application definition of the application, and, responsive to determining that the application container does not include the minimum version of the library: retrieve an instance of the library with a version that is greater than or equal to the minimum version; install the instance of the library in the container runtime of the application container; and execute the application using the instance of the library in the container runtime.

Example 10

The computing device of example 9, wherein the container runtime is further causes the one or more processors to: receive, from the application, an application programming interface call; and determine whether the application programming interface call is permitted.

Example 11

The computing device of example 10, wherein the container runtime further causes the one or more processors to, responsive to determining that that application programming interface call is not permitted, drop the application programming interface call.

Example 12

The computing device of example 10, wherein the container runtime is further causes the one or more processors to: responsive to determining that the application programming interface call is permitted: determine whether one or more parameters of the application programming interface call are valid parameters; and responsive to determining that the one or more parameters are valid, pass the application programming interface call to an operating system of the computing device.

Example 13

The computing device of any combination of examples 9-12, wherein the container runtime further causes the one or more processors to determine one or more dependencies of the application and retrieve the one or more dependencies, and wherein the application container further causes the one or more processors to, responsive to retrieving the one or more dependencies, execute the application including the one or more dependencies.

Example 14

The computing device of example 13, wherein the one or more dependencies comprise required dependencies, and wherein the container runtime further causes the one or more processors to: determine one or more optional dependencies of the application; and retrieve the one or more optional dependencies.

Example 15

The computing device of example 14, wherein the application container executes the application before at least one of the one or more optional dependencies is received by the container runtime, and wherein, while executing the application, the application container further causes the one or more processors to: output, for display, a graphical user interface of the application including a placeholder graphical element for the at least one of the one or more optional dependencies not yet received by the container runtime; and responsive to receiving the at least one of the one or more optional dependencies, output, for display, information associated with the at least one optional dependency in place of the placeholder element.

Example 16

The computing device of any combination of examples 9-15, wherein the memory further stores instructions for a router of the application container, and wherein the router, when executed by the one or more computer processors, cause the one or more computer processors to: receive a user-specified identifier; query a router table comprising a plurality of mappings between installable sub-packages of the application and user-specified identifiers to determine whether an installable sub-package for particular functionality of the application is stored at the computing device; and, responsive to determining that the installable sub-package for the particular functionality is not stored locally at the computing device, send a message that includes an identifier of the installable sub-package to the second remote computing device.

Example 17

A non-transitory computer-readable storage medium encoded with instructions that, when executed, cause at least one processor of a computing device to: receive a request to execute an application; responsive to receiving the request, identify a minimum version of a library specified in an application definition of the application; and, responsive to determining that an application container for the application does not include the minimum version of the library: retrieve an instance of the library with a version that is greater than or equal to the minimum version; install the instance of the library in a container runtime of the application container; and execute the application using the instance of the library in the container runtime.

Example 18

The non-transitory computer-readable storage medium of example 17, wherein the instructions further cause the at least one processor to: receive, by the container runtime and from the application, an application programming interface call; determine, by the container runtime, whether the application programming interface call is permitted; responsive to determining that that application programming interface call is not permitted, drop the application programming interface call; and, responsive to determining that the application programming interface call is permitted: determine whether one or more parameters of the application programming interface call are valid parameters; and, responsive to determining that the one or more parameters are valid, pass the application programming interface call to an operating system of the computing device.

Example 19

The non-transitory computer-readable storage medium of any combination of examples 17 and 18, wherein the instructions further cause the at least one processor to: determine one or more optional dependencies of the application and one or more required dependencies of the application; retrieve the one or more optional dependencies and the one or more required dependencies; prior to receiving all of the one or more optional dependencies, execute the application including the one or more required dependencies; output, for display, a graphical user interface of the application including a placeholder graphical element for the at least one of the one or more optional dependencies not yet received by the container runtime; and responsive to receiving the at least one of the one or more optional dependencies, output, for display, information associated with the at least one optional dependency in place of the placeholder element.

Example 20

The non-transitory computer-readable storage medium of any combination of examples 17-19, wherein the instructions further cause the at least one processor to: receive a user-specified identifier; query a router table comprising a plurality of mappings between the installable sub-packages of the application and user-specified identifiers to determine whether an installable sub-package for particular functionality of the application is stored at the computing device; and, responsive to determining that the installable sub-package for the particular functionality is not stored locally at the computing device, send a message that includes an identifier of the installable sub-package to a remote computing device.

Example 21

A computing device comprising means for performing any combination of the methods of examples 1-8.

Example 22

A computer-readable storage medium encoded with instructions for performing any combination of the methods of examples 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
   receiving, by a supervisor component executing at a computing device, a request to execute an application, wherein at least an initial installable sub-package from a plurality of installable sub-packages of the application is installed at the computing device, and wherein the initial installable sub-package includes an application definition that specifies a minimum version of a library required by the application;
   responsive to receiving the request and prior to executing the application, identifying, by an application container executing at the computing device, the minimum version of the library specified in the application definition of the application, wherein the application container includes a container runtime having a plurality of libraries, wherein the application container maintains the plurality of installable sub-packages of the application, wherein each installable sub-package of the application includes a respective set of executable components for the application, and wherein each installable sub-package of the plurality of installable sub-packages are discrete from each other;
   determining, by the application container, whether the plurality of libraries included in the container runtime includes the minimum version of the library required by the application; and
   responsive to determining that the plurality of libraries included in the container runtime does not include the minimum version of the library:
      retrieving, by the application container, an instance of the library with a version that is greater than or equal to the minimum version;
      installing, by the application container, the instance of the library in the container runtime of the application container; and
      executing, by the application container, the application using the instance of the library installed in the container runtime and using the initial installable sub-package.

2. The method of claim 1, further comprising:
   receiving, by the container runtime and from the application, an application programming interface call; and
   determining, by the container runtime, whether the application programming interface call is permitted.

3. The method of claim 2, further comprising:
   responsive to determining that that application programming interface call is not permitted, dropping, by the container runtime, the application programming interface call.

4. The method of claim 2, further comprising:
   responsive to determining that the application programming interface call is permitted:
      determining, by the container runtime, whether one or more parameters of the application programming interface call are valid parameters; and
      responsive to determining that the one or more parameters are valid, passing the application programming interface call to an operating system of the computing device.

5. The method of claim 1, further comprising:
   determining, by the container runtime of the application container, one or more dependencies of the application;
   retrieving, by the container runtime, the one or more dependencies; and
   responsive to retrieving the one or more dependencies, executing, by the application container, the application including the one or more dependencies.

6. The method of claim 5, wherein the one or more dependencies comprise required dependencies, the method further comprising:
   determining, by the container runtime, one or more optional dependencies of the application; and
   retrieving, by the container runtime, the one or more optional dependencies.

7. The method of claim 6, wherein executing the application occurs before at least one of the one or more optional dependencies is received by the container runtime, and wherein executing the application comprises:
   outputting, by the computing device, for display, a graphical user interface of the application including a placeholder graphical element for the at least one of the one or more optional dependencies not yet received by the container runtime; and
   responsive to receiving the at least one of the one or more optional dependencies, outputting, by the computing device, for display, information associated with the at least one optional dependency in place of the placeholder element.

8. The method of claim 1, further comprising:
   receiving, by a router of the application container, a user-specified identifier;
   querying, by the router of the application container, a router table comprising a plurality of mappings between the plurality of installable sub-packages of the application and user-specified identifiers to determine whether an installable sub-package for particular functionality of the application is stored at the computing device; and
   responsive to determining that the installable sub-package for the particular functionality is not stored locally at the computing device, sending a message that includes an identifier of the installable sub-package to a remote computing device.

9. A computing device comprising:
   one or more computer processors; and
   a memory that stores at least an initial installable sub-package from a plurality of installable sub-packages of an application, instructions for a supervisor component and an application container for the application, wherein the initial installable sub-package includes an application definition that specifies a minimum version of a library required by the application, wherein the application container includes a container runtime having a plurality of libraries, wherein the application container maintains the plurality of installable sub-packages of the application, wherein each installable sub-package of the application includes a respective set of executable components for the application, and wherein each installable sub-package of the plurality of installable sub-packages are discrete from each other,
   wherein the supervisor component, when executed by the one or more computer processors, causes the one or more computer processors to receive a request to execute the application, and
   wherein the application container, when executed by the one or more computer processors, causes the one or more computer processors to:
      responsive to receiving the request to execute the application and prior to executing the application, identify the minimum version of the library specified in the application definition of the application;
      determine whether the plurality of libraries included in the container runtime includes the minimum version of the library required by the application; and
      responsive to determining that the plurality of libraries included in the container runtime does not include the minimum version of the library:
         retrieve an instance of the library with a version that is greater than or equal to the minimum version;
         install the instance of the library in the container runtime of the application container; and
         execute the application using the instance of the library installed in the container runtime and using the initial installable sub-package.

10. The computing device of claim 9, wherein the container runtime is further causes the one or more processors to:
   receive, from the application, an application programming interface call; and
   determine whether the application programming interface call is permitted.

11. The computing device of claim 10, wherein the container runtime further causes the one or more processors to, responsive to determining that that application programming interface call is not permitted, drop the application programming interface call.

12. The computing device of claim 10, wherein the container runtime is further causes the one or more processors to:
   responsive to determining that the application programming interface call is permitted:
      determine whether one or more parameters of the application programming interface call are valid parameters; and
      responsive to determining that the one or more parameters are valid, pass the application programming interface call to an operating system of the computing device.

13. The computing device of claim 9,
   wherein the container runtime further causes the one or more processors to determine one or more dependencies of the application and retrieve the one or more dependencies, and
   wherein the application container further causes the one or more processors to, responsive to retrieving the one or more dependencies, execute the application including the one or more dependencies.

14. The computing device of claim 13, wherein the one or more dependencies comprise required dependencies, and wherein the container runtime further causes the one or more processors to:
   determine one or more optional dependencies of the application; and
   retrieve the one or more optional dependencies.

15. The computing device of claim 14, wherein the application container executes the application before at least one of the one or more optional dependencies is received by the container runtime, and wherein, while executing the application, the application container further causes the one or more processors to:
   output, for display, a graphical user interface of the application including a placeholder graphical element for the at least one of the one or more optional dependencies not yet received by the container runtime; and
   responsive to receiving the at least one of the one or more optional dependencies, output, for display, information associated with the at least one optional dependency in place of the placeholder element.

16. The computing device of claim 9, wherein the memory further stores instructions for a router of the application container, and wherein the router, when executed by the one or more computer processors, cause the one or more computer processors to:
   receive a user-specified identifier;
   query a router table comprising a plurality of mappings between the plurality of installable sub-packages of the application and user-specified identifiers to determine whether an installable sub-package for particular functionality of the application is stored at the computing device; and
   responsive to determining that the installable sub-package for the particular functionality is not stored locally at the computing device, send a message that includes an identifier of the installable sub-package to a remote computing device.

17. A non-transitory computer-readable storage medium encoded with instructions that, when executed, cause at least one processor of a computing device to:
   receive a request to execute an application, wherein at least an initial installable sub-package from a plurality of installable sub-packages of the application is installed at the computing device, and wherein the initial installable sub-package includes an application definition that specifies a minimum version of a library required by the application;
   responsive to receiving the request and prior to executing the application, execute an application container that identifies the minimum version of the library specified in the application definition of the application, wherein the application container includes a container runtime having a plurality of libraries, wherein the application container maintains the plurality of installable sub-packages of the application, wherein each installable sub-package of the application includes a respective set of executable components for the application, and wherein each installable sub-package of the plurality of installable sub-packages are discrete from each other;
   determine whether the plurality of libraries included in the container runtime includes the minimum version of the library; and
   responsive to determining that the plurality of libraries included in the container runtime does not include the minimum version of the library:
      retrieve, using the application container, an instance of the library with a version that is greater than or equal to the minimum version;
      install, using the application container, the instance of the library in the container runtime of the application container; and
      execute, using the application container, the application using the instance of the library in the container runtime and using the initial installable sub-package.

18. The non-transitory computer-readable storage medium of claim 17, wherein the instructions further cause the at least one processor to:
   receive, from the application, an application programming interface call;
   determine whether the application programming interface call is permitted;
   responsive to determining that that application programming interface call is not permitted, drop the application programming interface call; and
   responsive to determining that the application programming interface call is permitted:
      determine whether one or more parameters of the application programming interface call are valid parameters; and
      responsive to determining that the one or more parameters are valid, pass the application programming interface call to an operating system of the computing device.

19. The non-transitory computer-readable storage medium of claim 17, wherein the instructions further cause the at least one processor to:
   determine one or more optional dependencies of the application and one or more required dependencies of the application;
   retrieve the one or more optional dependencies and the one or more required dependencies;
   prior to receiving all of the one or more optional dependencies, execute the application including the one or more required dependencies;
   output, for display, a graphical user interface of the application including a placeholder graphical element for the at least one of the one or more optional dependencies not yet received by the container runtime; and
   responsive to receiving the at least one of the one or more optional dependencies, output, for display, information associated with the at least one optional dependency in place of the placeholder element.

20. The non-transitory computer-readable storage medium of claim 17, wherein the instructions further cause the at least one processor to:
   receive a user-specified identifier;
   query a router table comprising a plurality of mappings between the plurality of installable sub-packages of the application and user-specified identifiers to determine whether an installable sub-package for particular functionality of the application is stored at the computing device; and
   responsive to determining that the installable sub-package for the particular functionality is not stored locally at the computing device, send a message that includes an identifier of the installable sub-package to a remote computing device.

* * * * *